United States Patent
Tsiaflakis et al.

(10) Patent No.: US 9,413,478 B2
(45) Date of Patent: Aug. 9, 2016

(54) METHOD AND SYSTEMS FOR REDUCING CROSSTALK

(71) Applicants: Paschalis Tsiaflakis, Schriek (BE); Jochen Maes, Laakdal (BE); Carl J. Nuzman, Union, NJ (US)

(72) Inventors: Paschalis Tsiaflakis, Schriek (BE); Jochen Maes, Laakdal (BE); Carl J. Nuzman, Union, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 66 days.

(21) Appl. No.: 14/562,197

(22) Filed: Dec. 5, 2014

(65) Prior Publication Data

US 2016/0164621 A1    Jun. 9, 2016

(51) Int. Cl.
| | |
|---|---|
| *H04M 9/08* | (2006.01) |
| *H04J 3/10* | (2006.01) |
| *H04J 3/16* | (2006.01) |
| *H04B 3/32* | (2006.01) |
| *H04L 5/14* | (2006.01) |

(52) U.S. Cl.
CPC ... *H04J 3/10* (2013.01); *H04B 3/32* (2013.01); *H04J 3/1694* (2013.01); *H04L 5/1461* (2013.01)

(58) Field of Classification Search
CPC .......................................................... H04J 3/10
See application file for complete search history.

(56) References Cited

U.S. PATENT DOCUMENTS

| | | | | |
|---|---|---|---|---|
| 2010/0278222 A1* | 11/2010 | De Lind Van Wijngaarden | ....... | H04M 11/062 375/220 |
| 2012/0224674 A1* | 9/2012 | Goodson | ................. | H04B 3/32 379/27.01 |
| 2014/0023190 A1* | 1/2014 | Liang | ........................ | H04J 3/10 379/406.08 |
| 2014/0153630 A1* | 6/2014 | Strobel | ................. | H04L 1/0001 375/229 |
| 2014/0161000 A1* | 6/2014 | Fazlollahi | ............... | H04B 3/32 370/280 |
| 2014/0169489 A1* | 6/2014 | Eriksson | .................. | H04B 3/32 375/260 |
| 2014/0205082 A1 | 7/2014 | Nuzman | | |
| 2014/0254791 A1* | 9/2014 | Wei | ..................... | H04M 11/062 379/406.01 |
| 2016/0087677 A1* | 3/2016 | Strobel | .................... | H04B 3/32 375/285 |

OTHER PUBLICATIONS

"Self-FEXT cancellation (vectoring) for use with VDSL2 transceivers," Series G. Transmission Systems and Media, Digital Systems and Networks, ITU G.993.5, Apr. 2010.

* cited by examiner

*Primary Examiner* — Joseph T Phan

(74) *Attorney, Agent, or Firm* — Harness, Dickey & Pierce, P.L.C.

(57) ABSTRACT

At least one example embodiment discloses a method of reducing crosstalk in a system. The method includes obtaining a plurality of groups of lines based on crosstalk characteristics of the system, lines in a same group of lines being permitted to be active during a same time slot, identifying a first set of lines associated with data to send and a second set of lines associated with no data to send, the first set of lines being designated for transmission during a selected time slot, modifying the first set of lines in accordance with the plurality of groups of lines and transmitting symbols during the selected time slot using the modified first set of lines.

22 Claims, 5 Drawing Sheets

METHOD AND SYSTEMS FOR REDUCING CROSSTALK

BACKGROUND

Performance of a digital subscriber line (DSL) in terms of capacity depends on a number of factors such as attenuation and a noise environment. Performance of a DSL transmission system is impacted by crosstalk interference from one twisted line pair to another twisted line pair with the same binder and, to a lesser extent, twisted line pairs in neighboring binders.

Consequently, crosstalk interference may affect data rates across a number of twisted pair lines.

For instance two communication lines are collocated next to each other induce a signal in each other. Due to the induced crosstalk and noise from other sources in the surroundings of the communication line, the data transported on these lines may be affected or corrupted by the crosstalk and noise. By reducing the crosstalk induced on a communication line or compensating the crosstalk induced on a communication line, the amount of corrupted data may be reduced and the rate at which information can be reliably communicated is increased.

G.vector uses mutually orthogonal pilots and correlation as described in "Self-FEXT cancellation (vectoring) for use with VDSL2 transceivers," *Series G: Transmission Systems and Media, Digital Systems and Networks, ITU G.993.5*, April 2010, the entire contents of which is incorporated by reference.

In the context of providing data network access to homes and businesses, various technologies collectively known as FTTx have been used or proposed. In these technologies, data is conveyed from a network operator to an intermediate location using fiber optics, and data is conveyed from the intermediate location to the customer location using DSL transmission over twisted pair copper lines. The term FTTdp refers to a scenario in which the intermediate location is a "distribution point", serving up to a few dozen customers within a distance of less than 200 m. For example, G.fast is a transmission technology that uses time division duplexing (TDD) to duplex downstream and upstream transmission.

SUMMARY

At least one example embodiment discloses a method of reducing crosstalk in a system. The method includes obtaining a plurality of groups of lines based on crosstalk characteristics of the system, lines in a same group of lines being permitted to be active during a same time slot, identifying a first set of lines associated with data to send and a second set of lines associated with no data to send, the first set of lines being designated for transmission during a selected time slot, modifying the first set of lines in accordance with the plurality of groups of lines and transmitting symbols during the selected time slot using the modified first set of lines.

In at least one example embodiment, the method further includes storing sets of precoder coefficients, a number of the plurality of groups of lines being greater than a number of the stored sets of precoder coefficients and determining precoder coefficients for the modified first set of lines based on at least one of the stored sets of precoder coefficients, wherein the transmitting is based on the determined precoder coefficients for the modified first set of lines.

In at least one example embodiment, the sets of precoder coefficients correspond to clusters of lines, each of the plurality of groups of lines including at least one of the clusters of lines.

In at least one example embodiment, the plurality of groups of lines includes all possible combinations of the clusters of lines.

In at least one example embodiment, the modifying includes activating lines that are part of both the second set and the modified first set.

In at least one example embodiment, the transmitting includes transmitting idle symbols in the lines that are part of both the second set and the modified first set.

In at least one example embodiment, the modifying includes deactivating lines that are part of the first set and not the modified first set.

In at least one example embodiment, the generating at least one group includes obtaining at least one quad pair and generating the plurality of groups of lines based on the at least one quad pair.

In at least one example embodiment, the method further includes estimating a precoding matrix based on the modified first set.

In at least one example embodiment, the estimating includes estimating a portion of the precoding matrix as:

$$(P_{DD})^{-1} \approx M_{DD} = (B_{DD})^{-1}(2I - P_{DD}(B_{DD})^{-1})$$

where D is a set of inactive lines, $M_{DD}$ is a precoder component matrix and $B_{DD}$ is a sparse matrix associated with interactions of one of plurality of groups.

In at least one example embodiment, the method includes storing block inverse matrices for the clusters, respectively, a number of the plurality of groups of lines being greater than a number of the stored block inverse matrices and determining precoder coefficients for the modified first set of lines based on the stored block inverse matrices.

At least one example embodiment discloses an access node including a processor configured to obtain a plurality of groups of lines based on crosstalk characteristics of the system, lines in a same group of lines being permitted to be active during a same time slot, identify a first set of lines associated with data to send and a second set of lines associated with no data to send, the first set of lines being designated for transmission during a selected time slot, and modify the first set of lines in accordance with the plurality of groups of lines and a transmitter configured to transmit symbols during the selected time slot using the modified first set of lines.

In at least one example embodiment, the access node includes a memory configured to store sets of precoder coefficients, a number of the plurality of groups of lines being greater than a number of the stored sets of precoder coefficients, and the processor is configured to determine precoder coefficients for the modified first set of lines based on at least one of the stored sets of precoder coefficients, wherein the transmitter is configured to transmit the symbols based on the determined precoder coefficients for the modified first set of lines.

In at least one example embodiment, the sets of precoder coefficients correspond to clusters of lines, each of the plurality of groups of lines including at least one of the clusters of lines.

In at least one example embodiment, the plurality of groups of lines includes all possible combinations of the clusters.

In at least one example embodiment, the processor is configured to activate lines that are part of both the second set and the modified first set.

In at least one example embodiment, the transmitter is configured to transmit idle symbols in the lines that are part of both the second set and the modified first set.

In at least one example embodiment, the processor is configured to deactivate lines that are part of the first set and not the modified first set.

In at least one example embodiment, the processor is configured to obtain at least one quad pair and generate the plurality of groups of lines based on the at least one quad pair.

In at least one example embodiment, the processor is configured to estimate a precoding matrix based on the modified first set.

In at least one example embodiment, the processor is configured to estimate a portion of the precoding matrix as:

$$(P_{DD})^{-1} \approx M_{DD} = (B_{DD})^{-1}(2I - P_{DD}(B_{DD})^{-1})$$

where D is a set of inactive lines, $M_{DD}$ is a precoder component matrix and $B_{DD}$ is a sparse matrix associated with interactions of one of plurality of groups.

In at least one example embodiment, the access node further includes a memory configured to store block inverse matrices for the clusters, respectively, a number of the plurality of groups of lines being greater than a number of the stored block inverse matrices, and the processor is configured to determine precoder coefficients for the modified first set of lines based on the stored block inverse matrices.

BRIEF DESCRIPTION OF THE DRAWINGS

Example embodiments will become more appreciable through the description of the drawings, which are not limiting of example embodiments, in which.

DETAILED DESCRIPTION OF EXAMPLE EMBODIMENTS

Figure 1:
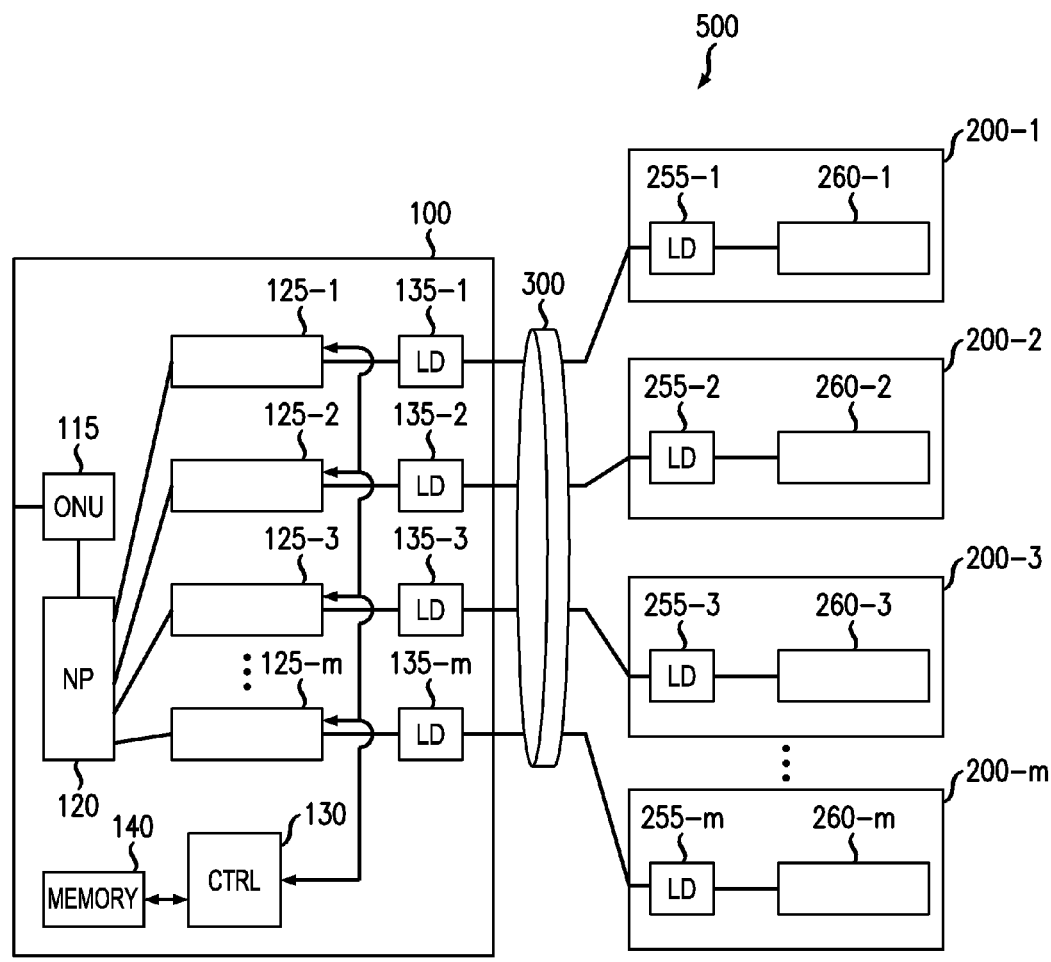
FIG. 1 illustrates a communication network according to an example embodiment.

Various example embodiments will now be described more fully with reference to the accompanying drawings in which some example embodiments are shown.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of algorithms performed by a controller. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements, existing end-user devices and/or post-processing tools (e.g., mobile devices, laptop computers, desktop computers, etc.). Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Note also that the software implemented aspects of example embodiments are typically encoded on some form of tangible (or recording) storage medium or implemented over some type of transmission medium. As disclosed herein, the term "storage medium" may represent one or more devices for storing data, including read only memory (ROM), random access memory (RAM), magnetic RAM, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Example embodiments may be implemented over the twisted pair section of an FTTdp network, but are not limited thereto.

G.fast is a transmission technology that uses time division duplexing (TDD) to duplex downstream and upstream transmission. TDD frames are used as data units, where each TDD frame consists of a separate downstream and upstream time interval. Each interval on its own is further divided into a normal operation interval (NOI) during which all lines are allowed to transmit data (typically vectored), and a discontinuous operation interval (DOI) during which only a subset of lines are allowed to transmit data, while the remaining lines are discontinued (quiet). Discontinuous vectoring refers to applying vectoring to the active lines in DOI. A symbol in NOI can in principle be a data symbol or an idle symbol. In DOI, a line that is scheduled for transmission can transmit a data symbol, an idle symbol or a quiet symbol. However a line that is not scheduled for transmission in DOI, should transmit a quiet symbol.

Vector processing (for crosstalk cancellation in copper multi-line transmission) is significantly more challenging in G.fast than for VDSL due to at least: (1) G.fast uses higher frequencies (up to 106 MHz in phase 1 and up to 212 MHz in phase 2) compared to the frequency range of VDSL2 (up to 17 MHz or 30 MHz) which causes higher crosstalk levels and (2) subsets of lines (from the vectored group) can be switched OFF and ON rapidly (on a 20 is time scale=DMT time slot) to save energy.

Switching subsets of lines in G.fast employs time division duplexing for dynamic resource allocation (DRA). Switching OFF refers to switching a part of the analog front end and/or digital logic to a reduced power consumption level.

Dynamically switching high crosstalking lines ON and OFF in discontinuous vectoring can lead to a large amount of residual crosstalk, frequency domain equalizer (FEQ) variation, transmit power spectral density (PSD) increases (peak and average), that can (i) violate PSD specifications as defined in ITU standards, (ii) impact hardware (clipping of digital to analog converter and analog to digital converter, nonlinear operation).

To solve/reduce these issues, example embodiments disclose methods and systems that utilize a cluster based selection function that modifies the set of active lines and discontinued lines during a discontinuous vectoring operation.

The selection function permits modification/selection of the lines that are active and discontinued during each DMT time slot. In an example embodiment, a clustering component identifies clusters of lines of the vectored group based on the crosstalk characteristics and a selection component that modifies the groups of lines that are active or discontinued during a DMT slot based on the clustering information received from the clustering component.

A cluster may refer to a set of lines that have strong crosstalk between themselves, such as a strongly coupled pair. For example, two lines in a "quad pair" that are physically twisted together usually have much stronger crosstalk coupling to each other than to other lines. Such a pair of lines could constitute a cluster.

FIG. 1 illustrates a communication system according to an example embodiment. As shown in FIG. 1, the system 500 includes a distribution point or access node 100 and Customer Premises Equipment (CPEs) 200-1 to 200-M, where M may be an integer greater than 1.

The access node 100 may be under control of an operator. The access node 100 includes an optical network unit (ONU) 115 configured to communicate with a network processor (NP) 120. As is known, the ONU 115 provides a high-bandwidth data connection over a fiber optic channel to an optical line terminal (OLT) located in a central office. The ONU 115 passes received downstream data frames or packets to the NP 120, which then determines the destination for the frames or packets and accordingly forwards them to an appropriate interface (e.g., DSL, ADSL, G.fast, etc. interface). Similarly, in the upstream direction, the NP 120 forwards frames or packets from the interfaces to the ONU 115.

The NP 120 provides signals to processing devices 125-1 to 125-M. The processing devices 125 are configured for point-to-point communication.

The access node 100 further includes a controller 130. The controller 130 is configured to receive signal data collectively referred to as a signal vector from the processing devices 125. The signal data may include signal values intended to be received by corresponding processing devices 260-1 to 260-M in the CPEs 200. In the downstream direction, the controller 130 is also configured to precode the signal vector, and send the resulting data back to the processing devices 125 for transmission to the CPEs 200. The processing devices 125 then send the precoded signal data over respective lines 300 via respective line drivers 135-1 to 135-M. In the upstream direction, the processing devices 125 receive crosstalk-contaminated signals from the line drivers 135. The controller 130 receives the crosstalk-contaminated signals (collectively referred to as received signal vector) from the processing devices 125, postcodes the received signal vector, and provides the processing devices 125 with the post-compensated signal data. The processing devices 125 then continue to process the signal data to demodulate the intended upstream information.

Generally, the data exchanged between processing devices would be frequency-domain samples, but alternatively the data could be represented as time-domain samples, for example.

As discussed above, the controller 130 communicates with the processing devices 125. Alternatively, the controller 130 may be between the processing devices 125 and the respective line drivers 135-1 to 135-$m$. Thus, the location of the controller 130 is not limited to the location shown in FIG. 1.

Furthermore, it will be understood that the access node 100 may include a memory 140, or multiple memories. The NP 120, the controller 130, and/or the processing devices 125 execute programs and/or program modules stored on the memory 140 to perform their respective functions and the functions of the access node 100. The operation of the access node 100 will be described in greater detail below with respect to some example embodiments. The memories may be external to and/or internal to the NP 120, the controller 130, and/or the processing devices 125. For the purposes of simplicity of illustration only, only the memory 140 associated with the controller 130 is shown.

As discussed above, each of the processing devices 125 may communicate with a respective one of the CPEs 200 over the communication lines 300 through an associated line driver 135. The lines 300 (also referred to as links) may be telephone lines (e.g., twisted copper pairs), and the CPEs 200-1 to 200-M may be modems or other interface devices operating according to a communication standard for transmitting data over telephone lines. The CPEs 200-1 to 200-M may be located in various customer premises. Each of the CPEs 200-1 to 200-M includes a line driver 255-1 to 255-M and respective processing devices 260-1 to 260-M. Each of the line drivers 255 may be the same or substantially the same as the line drivers 135.

Figure 2:
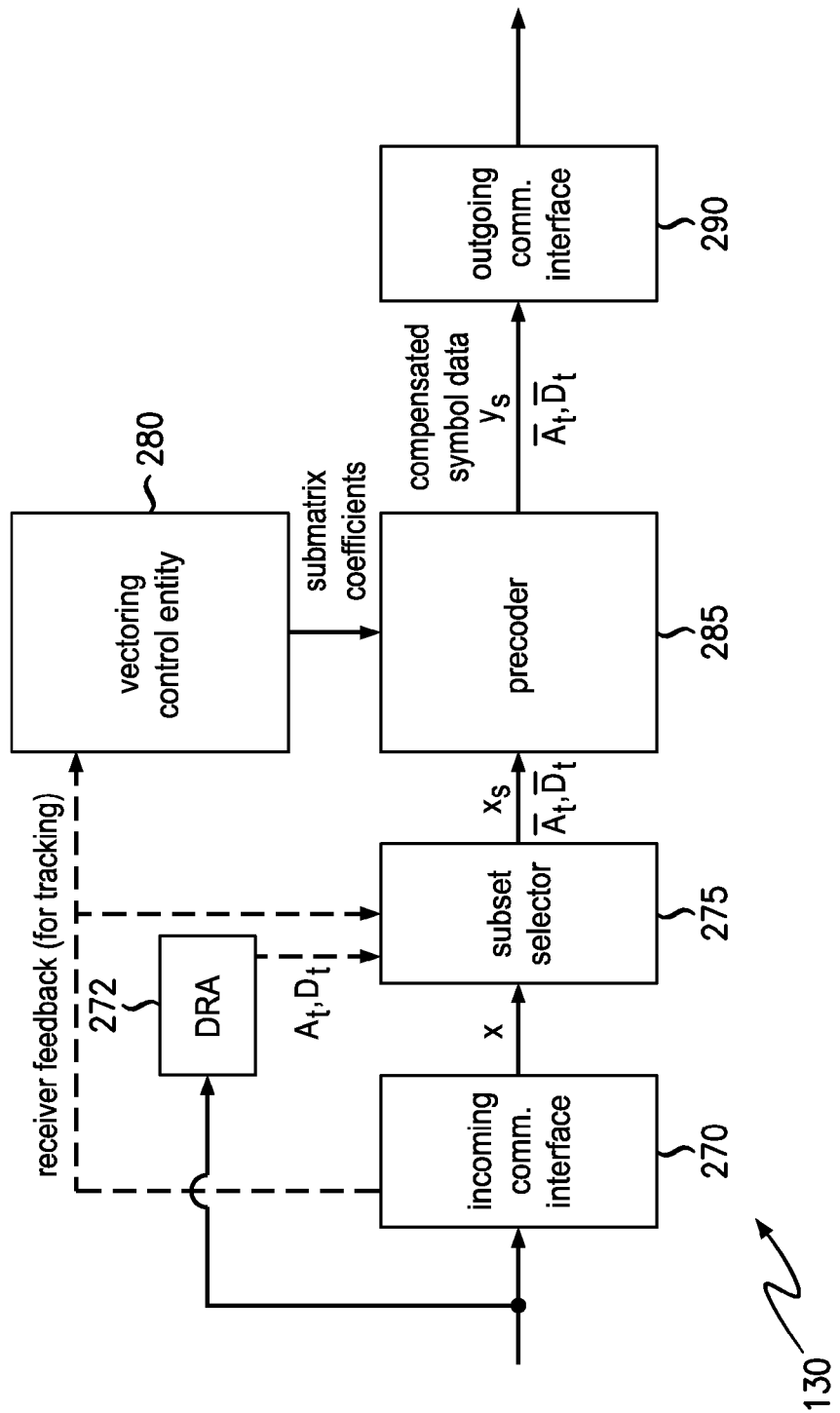
FIG. 2 illustrates a controller including a precoder according to an example embodiment.

FIG. 2 illustrates the controller 130 including a precoder according to an example embodiment. The controller 130 has a communication interface 270 with each of the processing devices 125-1 to 125-$m$. The incoming communication interface 270 receives data and control signals from the processing devices 125-1 to 125-$m$. The incoming communication interface 270 forwards symbol data x from the respective processing devices 125-1 to 125-$m$ that are to be precoded to the subset selector 275.

The processing devices 125-1 to 125-$m$ may maintain individual queues containing packets of information to be sent on each of the N lines. At any point in time, some queues may have packets waiting to be sent, while other queues are empty.

A dynamic resource allocation (DRA) module 272 collects information about the queues from the processing devices 125-1 to 125-$m$. The DRA module 272 then determines which subset of lines is permitted to be active in each time slot using any known algorithm.

The DRA module 272 notifies the subset selector 275 of a first set of lines that will transmit physical layer signals $A_t$ (active lines) and a second set of lines that will not send physical layer signals $D_t$ (discontinued lines) during a DMT slot t. The active lines may or may not have data to send. An active line without data to send is called an idle line; in a vectored system, all active idle lines send compensation signals generated by the precoder 285, regardless of whether they have data to send. The incoming communication interface 270 designates the active lines for transmission during a selected time slot.

The incoming communication interface 270 also forwards receiver feedback, such as crosstalk characteristics to the subset selector 275 and to a vectoring control entity (VCE) 280.

The crosstalk characteristics could be error feedback samples or DFT output samples collected by the receiver, as described in the G.fast recommendation (the samples are then processed by correlation etc. to come up with estimates of crosstalk coefficients). Alternatively, the crosstalk characteristics could be estimated of crosstalk coefficients, computed elsewhere and then forwarded to the VCE. Additionally, the crosstalk characteristics could be other forms of feedback, e.g., SNR measurements, that are affected by crosstalk and can be used to learn something about the crosstalk.

As will be described below, the subset selector 275 modifies the first set of lines. In other words, the subset selector 275 modifies/selects lines that are active and discontinued during the DMT slot t to generate the modified set of lines that are active $\overline{A}_T$ and the modified set of discontinued lines $\overline{D}_t$ during the DMT time slot t.

The subset selector 275 forwards symbol data $x_S$ corresponding to the modified subset of active lines $\overline{A}_t$ to a precoder 285. The precoder 285 applies coefficients received from the VCE 280 to the symbol data received from the subset selector 275 to produce compensated data symbols $y_s$ (precoded data), which are forwarded to an outgoing communication interface 290. The outgoing communication interface 290 sends the compensated data symbols to the processing devices 125-1 to 125-$m$. Additionally, the incoming communication interface 270 periodically receives receiver feedback data, which it forwards to the VCE 280. The VCE 280 uses this information to keep an inverse channel matrix and auxiliary matrices (e.g., $B^{-1}$) in the VCE 280 up to date.

In FIG. 2, the incoming communication interface 270, the subset selector 275, the precoder 285 and the outgoing communication interface 290 may be considered data path elements while the DRA module 272 and the vectoring control entity 280 may be considered control path elements that instruct the data path elements what to do.

Each of the incoming communication interface 270, the subset selector 275, the precoder 285, the outgoing communication interface 290, the DRA module 272 and the vectoring control entity 280 may be implemented in hardware, a processor configured to execute software, firmware, or any combination thereof, for example. When at least one of the incoming communication interface 270, the subset selector 275, the precoder 285, the outgoing communication interface 290, the DRA module 272 and the vectoring control entity 280 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the at least one of the incoming communication interface 270, the subset selector 275, the precoder 285, the outgoing communication interface 290, the DRA module 272 and the vectoring control entity 280. CPUs, DSPs, ASICs and FPGAs may generally be referred to as processors and/or microprocessors.

In the event where at least one of the incoming communication interface 270, the subset selector 275, the precoder 285, the outgoing communication interface 290, the DRA module 272 and the vectoring control entity 280 is a processor executing software, the processor is configured as a special purpose machine to execute the software, stored in a storage medium (e.g., memory 140), to perform the functions of the at least one of the incoming communication interface 270, the subset selector 275, the precoder 285, the outgoing communication interface 290, the DRA module 272 and the vectoring control entity 280. In such an embodiment, the processor may include one or more Central Processing Units (CPUs), digital signal processors (DSPs), application-specific-integrated-circuits (ASICs), field programmable gate arrays (FPGAs) computers.

Figure 3:
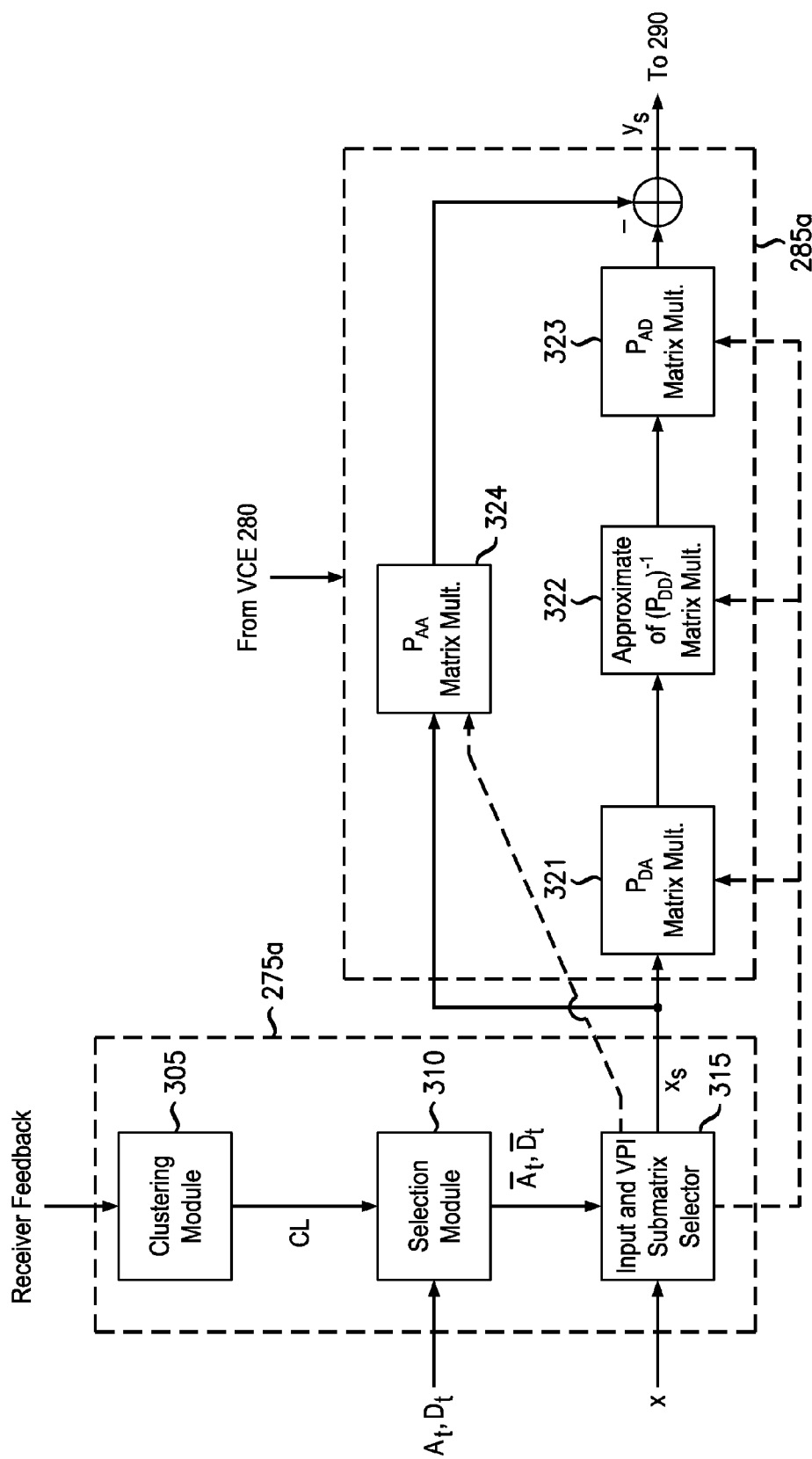
FIG. 3 illustrates an example embodiment of a subset selector and a precoder shown in FIG. 2.

FIG. 3 illustrates an example embodiment of the subset selector and the precoder shown in FIG. 2. As shown in FIG. 3, a subset selector 275a includes a clustering module 305, a selection module 310 and an input and virtual precoder input (VPI) submatrix selector 315. While the input and virtual precoder input (VPI) submatrix selector 315 is illustrated as part of the subset selector 275a, it should be understood that the input and virtual precoder input (VPI) submatrix selector 315 may be separate from the clustering module 305 and the selection module 310.

Each of the clustering module 305, the selection module 310 and the input and virtual precoder input (VPI) submatrix selector 315 may be implemented in hardware, a processor configured to execute software, firmware, or any combination thereof, for example. When at least one of the clustering module 305, the selection module 310 and the input and virtual precoder input (VPI) submatrix selector 315 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the at least one of the clustering module 305, the selection module 310 and the input and virtual precoder input (VPI) submatrix selector 315. CPUs, DSPs, ASICs and FPGAs may generally be referred to as processors and/or microprocessors.

In the event where at least one of the clustering module 305, the selection module 310 and the input and virtual precoder input (VPI) submatrix selector 315 is a processor executing software, the processor is configured as a special purpose machine to execute the software, stored in a storage medium (e.g., memory 140), to perform the functions of the at least one of the clustering module 305, the selection module 310 and the input and virtual precoder input (VPI) submatrix selector 315. In such an embodiment, the processor may include one or more Central Processing Units (CPUs), digital signal processors (DSPs), application-specific-integrated-circuits (ASICs), field programmable gate arrays (FPGAs) computers.

Moreover, the clustering module 305 may be considered part of the VCE 280, instead of the subset selector 275a. Cluster information CL, from the clustering module 305, is input to the faster operations of subset selection and precoding that happen on a per frame or per slot basis. In this example, the VCE 280 determines the cluster information CL.

The clustering module 305 receives the receiver feedback such as the crosstalk characteristics of the system 500. The clustering module 305 generates cluster information CL based on the crosstalk characteristics.

Based on the crosstalk characteristics of the channel, the clustering module 305 obtains clusters of lines of the lines $A_t$ and $D_t$ that strongly interfere with each other (from one line to another or in both directions). For instance, the two pairs of a quad can be put in a cluster as these typically interfere with each other. However, clusters can also be formed for cable bundles without quads as there can also be lines that heavily interfere with each other. For example, the clustering module 305 may determine whether crosstalk between two lines exceeds a threshold value.

It should be understood that the clusters are defined on a slower basis than a per slot basis and generally remain constant for longer than a time slot. When the set $A_t$, $D_t$ is received, the controller 130 determines which clusters the lines in $A_t$ belong to, and then increases $A_t$ to include all of the lines in those clusters. Then set $D_t$ is decreased to the lines in clusters that have no intersection with the original $A_t$.

Moreover, to determine clusters, the clustering module 305 may implement a greedy algorithm. For example, a greedy algorithm to put all lines into clusters of size two would work as follows: where for a channel matrix H, the clustering module 305 determines a largest off-diagonal element of H, $H_{km}$ and make the corresponding lines k and m into a pair. The clustering module 305 sets the k-th and m-th rows, and k-th and m-th columns, of H to zero and repeats the process until all lines have been placed into a pair. As another example, to ensure that the crosstalk between any two lines that are not in the same cluster is below a threshold, the clustering module 305 may form an undirected graph in which each graph node represents a line, and where there is an edge between nodes k and m if the magnitude of element $H_{km}$ or $H_{mk}$ is above the threshold. The connected components of this graph are then calculated by well-known algorithms, and then each connected component of the graph determines a cluster of lines. The fact that the components are not connected to each other in the graph implies that the crosstalk between lines in different clusters is below the specified threshold.

The clustering module 305 clusters heavy interferers together. The clusters of lines are sent by the clustering module 305 to the selection module 310 as the cluster information CL.

The groups of clusters may be stored in the memory 140. Moreover, sets of precoder coefficients for the clusters, respectively, may be stored in the memory. Storing sets of precoder coefficients for the clusters provides a memory efficient system. Lines may be ordered according to cluster; first the lines of the first cluster, then the lines of the second cluster, etc. The precoder matrix P for the case that all lines are active can be decomposed as $$P = B + C,$$

where B is a block diagonal matrix, giving the precoder coefficients within clusters, and C contains the precoder coefficients between clusters. Then we store the entire matrix P. Let $B_k$ denote the subblock associated with cluster k. Then, in addition we compute and store the inverse matrix $B_k^{-1}$ of each subblock. If the clusters are small, the memory and computation required for this is small compared with the size of P.

These stored subblocks can be used later to construct the inverse $B_{QQ}^{-1}$ of any set of lines Q that consists of the union of one or more clusters.

By utilizing clusters, a plurality of groups of lines can be larger (giving flexibility useful for optimizing power savings) than the number of clusters.

For example, if there are N lines that are divided into N/2 atomic groups of size two, then the plurality of groups of lines could include all $2^{(N/2)}$ possible sets of pairs. So, for example with 20 lines and 10 clusters, there may be a plurality of $2^{10}=1024$ different groups to choose from.

However, the system does not store separate precoder coefficients for each of the 1024 different groups in the example.

The memory 140 stores 2×2 inverse matrices (precoder coefficients) for each of the ten clusters, $B_1^{-1}$ through $B_k^{-1}$.

The selection module 310 modifies the first set of lines associated with data to send $A_t$ and a second set of lines associated with no data to send $D_t$ based on the clustering information CL to generate the modified set of lines that are active $\overline{A}_t$ and the modified set of discontinued lines $\overline{D}_t$.

More specifically, the selection module 310 modifies the set of active $A_t$ and discontinued lines $D_t$ such that all lines from one cluster are jointly ON or jointly OFF in a discontinuous vectoring operation. The selection module 310 prevents the lines of one cluster to discontinue independently from each other. In case not all lines of a cluster have data to transmit, idle symbols are sent for the non-data bearing lines of that cluster so that all lines are kept active. If no lines of the cluster have data to transmit, they can be put OFF all together.

In an example embodiment, a line with data to send may be modified by the controller 130 to be turned off. In this case, the data waits in its queue for another opportunity to be sent. For example, if only one line in a large cluster has data to send, the controller 130 may turn the line off for some time to see if data arrives for other lines in the cluster, so that less power is wasted on idle symbols overall.

Without the clustering module 305 and the selection module 310, the set of lines that are active and discontinued over all symbols of a TDD frame are communicated directly to the input and VPI submatrix selector 315. No constraints would be enforced on the lines that can discontinue independently of each other. This may result in issues with FEQ variation and transmit PSD increase. By adding the clustering module 305 and the selection module 310, the set of active and discontinued lines over the symbols of a TDD frame may be modified, avoiding some subsets of lines to discontinue independently from each other or, in other words enforcing, subsets of lines to be jointly ON or jointly OFF.

Referring back to FIG. 3, the input signal x comes from the processing devices 125-1 to 125-m and is precoded by a virtual precoder input method. The VPI method is a vectoring method that allows to discontinue subsets of the vectored group in an autonomous way (during normal or discontinuous operation), for example, as disclosed in U.S. Patent Application No. 2014/0205082, entitled "Methods and Systems for Reducing Crosstalk," the entire contents of which is hereby incorporated by reference.

The active and discontinued periods for each line can be determined by the DRA module 272 through parameters (Ttr, A, B, which are described in G.fast) which corresponds to values $A_t$, $D_t$ that indicate which lines are active (data or idle) or are discontinued over the time slots of a TDD frame.

The DRA module 272 decides on a time division duplex (TDD) schedule, i.e. which lines are active or discontinued during the symbols of a TDD frame, for both upstream and downstream. However, not all schedules are possible, but only those schedules that can be characterized by a set of parameters (Ttr, A, B). More specifically, Ttr defines a number of symbols in NOI, i.e., all lines should be active during this amount of symbols.

For example, if Ttr=5 for the downstream, all lines should transmit data (or idles) in the first five symbols in downstream, which represents the NOI. The parameter An defines the number of discontinued (quiet) symbols inserted at the beginning of DOI for a particular line n (in downstream or upstream). For example, if A is 4 for line 1 downstream, then 4 discontinued (quiet) symbols are inserted at the beginning of DOI (directly after the NOI period). The parameter Bn defines the number of allowed active symbols during the single active period of DOI for a particular line n (in downstream or upstream). For example, if B1 is 3 for line 1 downstream, then 3 active symbols can be transmitted during the single active period of DOI.

These Ttr, A, B values have a one-to-one mapping to the values of $A_t$, $D_t$. Similarly, the values $\overline{A}_t$, $\overline{D}_t$ have a one-to-one mapping to some value for Ttr, A, and B.

The selection module 310 modifies the first set of lines associated with data to send $A_t$ and a second set of lines associated with no data to send $D_t$ to the modified set of lines that are active $\overline{A}_t$ and the modified set of discontinued lines $\overline{D}_t$ based on the clustering information CL so that all lines from a cluster are jointly active (possibly by adding idles) or jointly discontinued.

The input and VPI submatrix selector 315 component receives (1) the data signal x that is to be precoded (e.g., vectored) and (2) the scheduled $\overline{A}_t$, $\overline{D}_t$ that contains which lines to have active and discontinued during each symbol of the considered TDD frame.

The input and VPI submatrix selector 315 first selects only those data signals from the input x that are to be processed during a symbol t of the TDD frame, which is defined by $\overline{A}_t$, $\overline{D}_t$ resulting in the symbol data $x_S$.

The input and VPI submatrix selector 315 then also selects which matrices are to be used in the blocks $P_{AA}$, $P_{DA}$, $P_{DD}$, $P_{AD}$, depending on the inputs $\overline{A}_t$ and $\overline{D}_t$. This corresponds to choosing the correct parts from the vector processor memory 140 and applying these as matrix multipliers to the symbol data $x_S$.

The input and VPI submatrix selector 315 sends the symbol data $x_S$ to a precoder 285a.

The VCE 280 will compute the overall precoder matrix P and the individual cluster inverse matrices $B_k^{-1}$ and communicate this information to the memory 140. The input and VPI submatrix selector 315 will then dynamically take part of the precomputed precoder P to form the submatrices $P_{AA}$, $P_{DA}$, $P_{AD}$, and $P_{DD}$, wherein A represents the active lines and D represents a subset containing an N-A number of inactive lines from an N number of communication lines. The determination of $P_{AA}$, $P_{DA}$ and $P_{AD}$ are performed by the controller 130 using conventional methods, as described in U.S. Patent Application Publication No. 2014/0205082. The determination of $P_{DD}^{-1}$ may be based on the clustering information CL and the cluster inverse matrices $B_k^{-1}$, as described below. The precoder 285a includes matrix multipliers 321, 322, 323 and 324.

The matrix multipliers 321-323 are connected in series. More specifically, the matrix multiplier 321 multiplies the symbol data $x_S$ with the sub-matrix $P_{DA}$. The product of the matrix multiplier 321 is then multiplied with the approximation of $P_{DD}^{-1}$ at the matrix multiplier 322. The product of the matrix multiplier 322 is then multiplied with the sub-matrix $P_{AD}$ by the matrix multiplier 323. The matrix multiplier 324 multiplies the symbol data $x_S$ with the sub-matrix $P_{AA}$. The precoder 285a then determines a difference between the product of the multiplier 324 and the product of the multiplier 323. In this example, the difference is the compensated symbol data. In an alternative embodiment, the difference may be added to the symbol data to generate the compensated symbol data.

Figure 4:
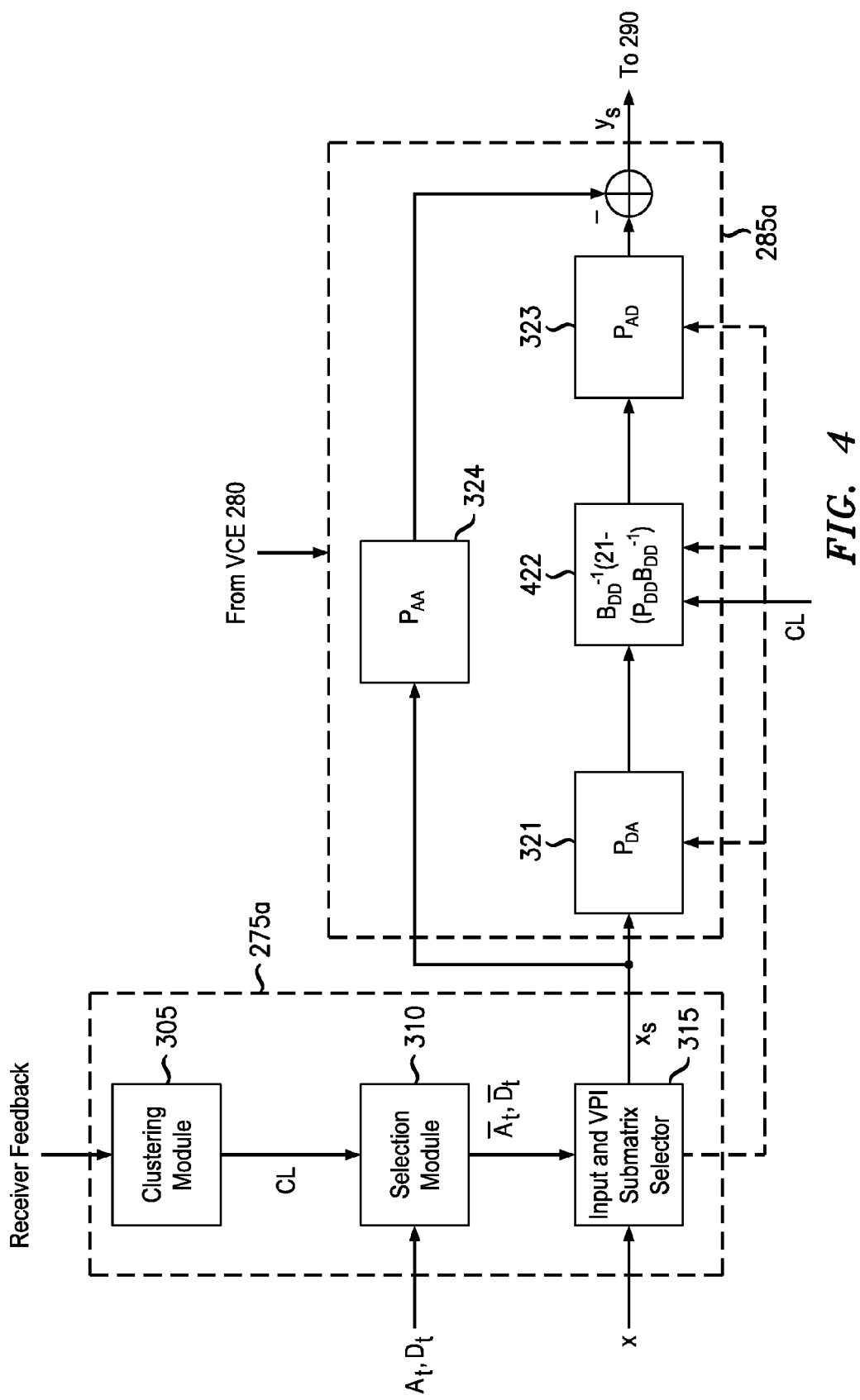
FIG. 4 illustrates another example embodiment of the subset selector and the precoder shown in FIG. 2.

FIG. 4 illustrates another example embodiment of the subset selector and the precoder shown in FIG. 2. In the example embodiment of FIG. 4, a precoder 285b uses the cluster information to reduce the approximation effects among lines in the cluster.

FIG. 4 is similar to FIG. 3. Therefore, only the differences will be described for the sake of brevity.

In FIG. 4, the precoder 285B utilizes the cluster information CL for a multiplier 422.

The VCE 280 substantially inverts the stored submatrices of the clustered lines (e.g. in case of strongly coupled pairs, 2×2 inverses can be considered to substantially cancel crosstalk between the strongly coupled pairs (e.g., quad pairs)). For example, a precoder matrix P over N lines, is designed to be the inverse of the channel matrix H, such that $$P = H^{-1} \tag{1}$$

During a particular symbol interval, the set of selected (active) lines is S, and the set of quiet lines is Q. In the example shown in FIG. 4, S would equal $A_t$ and Q would equal $D_t$.

For the input data vector $x_S$, the output vector is:

$$y_S = (H_{SS})^{-1} x_S \tag{2}$$

To obtain the result of equation (2), the matrix inversion lemma is used to write $$H_{SS}^{-1} = P_{SS} - P_{SQ} P_{QQ}^{-1} P_{QS} \tag{3}$$

An approximate inverse matrix to $P_{QQ}$ may be called $M_{QQ}$. Thus, an approximation to $y_S$ is generated from the equation $$y_S = P_{SS} x_S - (P_{SQ}(M_{QQ}(P_{QS} x_S))) \tag{4}$$

The brackets indicate the order of operation in the hardware of the VCE 280.

Two ways the VCE 280 may determine $M_{QQ}$ are by using a second order method such that $$M_{QQ} = I \tag{5}$$

or, using a third order method such that $$P_{QQ} = I + C_{QQ}, \text{ and let } M_{QQ} = I - C_{QQ} \tag{6}$$

The diagonal terms of $P_{QQ}$ need not be unity, so $C_{QQ}$ as constructed above can have non-zero diagonals. Thus, the precoder matrix may be determined by $$P = D + C \tag{7}$$

where D is a diagonal matrix, and C has zero diagonals. As a result, $$P_{QQ} = (I + C_{QQ} D_{QQ}^{-1}) D_{QQ} \tag{8}$$

$$P_{QQ}^{-1} = D_{QQ}^{-1} (I + C_{QQ} D_{QQ}^{-1})^{-1} \tag{9}$$

Leading to:

Exact diagonal (ED) $2^{nd}$-order method: $M_{QQ} = D_{QQ}^{-1}$ (10)

ED $3^{rd}$-order method: $M_{QQ} = D_{QQ}^{-1}(I - C_{QQ} D_{QQ}^{-1}) = D_{QQ}^{-1}(2I - P_{QQ} D_{QQ}^{-1})$ (11)

To implement the ED methods, the precoder does not need to be able to do complex division. Instead, the VCE 280 can compute and send to the precoder both the precoder matrix P and the inverse diagonal matrix $D^{-1}$, such as described in U.S. Patent Application Publication No. 2014/0205082. In an example where clusters are pairs of lines (e.g., quad pairs):

$$P = B + C \tag{11}$$

where B is a sparse matrix capturing the strongly coupled pairs (e.g., quad pairs) interactions as described below, and C is zero wherever B is not.

In particular, $$B = X^T B' X \tag{12}$$

where X is a permutation matrix that reorders the lines to put the strongly coupled pairs next to each other, and B' is a block-diagonal matrix with 2×2 blocks on the diagonal. The p-th block, B'[p], is a two-by-two matrix giving the precoder coefficients associated with the p-th the strongly coupled pair (in the full inverse precoder P).

As a result, $$P_{QQ} = (I + C_{QQ} B_{QQ}^{-1}) B_{QQ} \tag{13}$$

$$P_{QQ}^{-1} = B_{QQ}^{-1} (I + C_{QQ} B_{QQ}^{-1})^{-1} \tag{14}$$

which suggests

Exact Quad (EQ) $2^{nd}$-order method: $M_{QQ} = B_{QQ}^{-1}$ (15)

EQ $3^{rd}$-order method: $M_{QQ} = B_{QQ}^{-1}(I - C_{QQ} B_{QQ}^{-1}) = B_{QQ}^{-1}(2I - P_{QQ} B_{QQ}^{-1})$ (16)

The VCE 280 computes the inverse $B'[p]^{-1}$ of each 2×2 block of B'. The VCE 280 then stores this information in the memory 140. P, and $B'^{-1}$, are stored in the memory 140.

The controller 130 uses non-overlapping clusters and only allows lines in a cluster to be all on or all off. Because the set Q is a disjoint union of clusters, $B_{QQ}$ is block-diagonal, with each block corresponding to one of the clusters, and $B_{QQ}^{-1}$ is the block-diagonal matrix obtained by replacing each diagonal block of $B_k$ of $B_{QQ}$ with the pre-computed inverse matrix $B_k^{-1}$.

As a result, referring back to FIG. 4, the VCE 280 would make the following calculations:

$$P_{DD} = B_{DD} + C_{DD} \tag{17}$$

$$(P_{DD})^{-1} \approx (B_{DD})^{-1}(I - C_{DD}(B_{DD})^{-1}) = (B_{DD})^{-1}(2I - P_{DD}(B_{DD})^{-1}) \tag{18}$$

with $B_{DD}$ being a sparse matrix capturing the cluster interactions, and $C_{DD}$ being zero wherever $B_{DD}$ is not. $P_{DD}$ or $C_{DD}$, and the block inverses $B_k^{-1}$ of the diagonal subblocks $B_k$ of $B_{DD}^{-1}$ are stored in the memory 140. $B_{DD}^{-1}$ is a block diagonal matrix where each block is an inverse of a cluster that resides in the discontinued line set.

By utilizing clusters, the access node 100 avoids the worst of the inaccuracies by "hiding" the strongest crosstalk inside the clusters.

Figure 5:
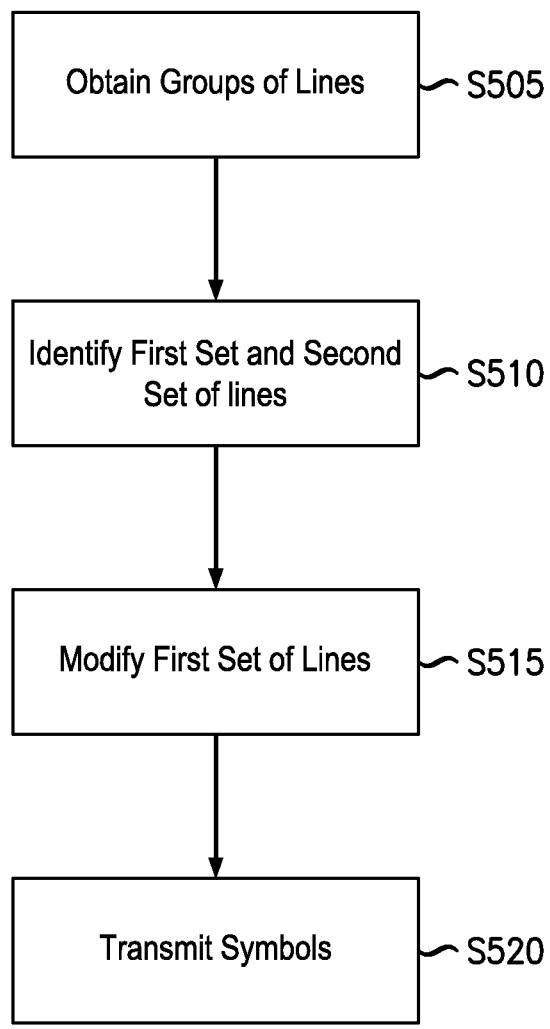
FIG. 5 illustrates a method of reducing crosstalk in a system.

FIG. 5 illustrates a method of reducing crosstalk in a system. The method of FIG. 5 may be performed by the node 100, as described above.

At S505, the access node obtains a plurality of groups of lines based on crosstalk characteristics of the system. The lines in a same group are permitted to be active during a same time slot. As described above, the access node may determine clusters and store corresponding information. If there are N lines that are divided into N/2 clusters of size two, then the plurality of groups of lines could include all $2^{(N/2)}$ possible sets. So, for example, with 20 lines and 10 clusters, there may be a plurality of $2^{10} = 1024$ different groups to choose from.

At S510, the access node identifies a first set of lines associated with data to send and a second set of lines associated with no data to send. The first set of lines is designated for transmission during a selected time slot. For example, the incoming communication interface 270 notifies the subset selector 275 of a first set of lines associated with data to send $A_t$ (active lines) and a second set of lines associated with no data to send $D_t$ (discontinued lines) during a DMT slot t.

At S515, the access node modifies the first set of lines in accordance with the plurality of groups of lines. For example, the subset selector 275 modifies/selects lines that are active and discontinued during the DMT slot t to generate the modified set of lines that are active $\bar{A}_t$ and the modified set of discontinued lines $\bar{D}_t$ during the DMT time slot t.

At S520, the access node transmits symbols during the selected time slot using the modified first set of lines. For example, the precoder 285 applies coefficients received from the VCE 280 to the symbol data received from the subset selector 275 to produce compensated data symbols $y_s$ (precoded data), which are forwarded to an outgoing communication interface 290. The outgoing communication interface 290 sends the compensated data symbols to the processing devices 125-1 to 125-m. Additionally, the incoming communication interface 270 periodically receives receiver feedback data, which it forwards to the VCE 280. The processing devices 125 then send the precoded signal data over respective lines 300 via respective line drivers 135-1 to 135-M.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

We claim:

1. A method of reducing crosstalk in a system, the method comprising:
    obtaining a plurality of groups of lines based on crosstalk characteristics of the system, lines in a same group of lines being permitted to be active during a same time slot;
    identifying a first set of lines associated with data to send and a second set of lines associated with no data to send, the first set of lines being designated for transmission during a selected time slot;
    modifying the first set of lines in accordance with the plurality of groups of lines; and
    transmitting symbols during the selected time slot using the modified first set of lines.

2. The method of claim 1, further comprising:
    storing sets of precoder coefficients, a number of the plurality of groups of lines being greater than a number of the stored sets of precoder coefficients; and
    determining precoder coefficients for the modified first set of lines based on at least one of the stored sets of precoder coefficients, wherein the transmitting is based on the determined precoder coefficients for the modified first set of lines.

3. The method of claim 2, wherein the sets of precoder coefficients correspond to clusters of lines, each of the plurality of groups of lines including at least one of the clusters of lines.

4. The method of claim 3, wherein the plurality of groups of lines includes all possible combinations of the clusters of lines.

5. The method of claim 1, wherein the modifying includes, activating lines that are part of both the second set and the modified first set.

6. The method of claim 5, wherein the transmitting includes,
    transmitting idle symbols in the lines that are part of both the second set and the modified first set.

7. The method of claim 1, wherein the modifying includes, deactivating lines that are part of the first set and not the modified first set.

8. The method of claim 1, wherein the obtaining includes, obtaining at least one quad pair; and
    generating the plurality of groups of lines based on the at least one quad pair.

9. The method of claim 1, further comprising:
    estimating a precoding matrix based on the modified first set.

10. The method of claim 9, wherein the estimating includes estimating a portion of the precoding matrix as:

$$(P_{DD})^{-1} \approx M_{DD} = (B_{DD})^{-1}(2I \times P_{DD}(B_{DD})^{-1})$$

where D is a set of inactive lines, $M_{DD}$ is a precoder component matrix and $B_{DD}$ is a sparse matrix associated with interactions of one of the plurality of groups.

11. The method of claim 1, wherein the plurality of groups of lines includes all possible combinations of a plurality of clusters of the lines, the method further comprising:
    storing block inverse matrices for the clusters, respectively, a number of the plurality of groups of lines being greater than a number of the stored block inverse matrices; and
    determining precoder coefficients for the modified first set of lines based on the stored block inverse matrices.

12. An access node comprising:
    a processor configured to,
        obtain a plurality of groups of lines based on crosstalk characteristics of the system, lines in a same group of lines being permitted to be active during a same time slot,
        identify a first set of lines associated with data to send and a second set of lines associated with no data to send, the first set of lines being designated for transmission during a selected time slot, and
        modify the first set of lines in accordance with the plurality of groups of lines; and
    a transmitter configured to transmit symbols during the selected time slot using the modified first set of lines.

13. The access node of claim 12, further comprising:
    a memory configured to store sets of precoder coefficients, a number of the plurality of groups of lines being greater than a number of the stored sets of precoder coefficients, wherein
    the processor is configured to determine precoder coefficients for the modified first set of lines based on at least one of the stored sets of precoder coefficients, and
    the transmitter is configured to transmit the symbols based on the determined precoder coefficients for the modified first set of lines.

14. The access node of claim 13, wherein the sets of precoder coefficients correspond to clusters of lines, each of the plurality of groups of lines including at least one of the clusters of lines.

15. The access node of claim 14, wherein the plurality of groups of lines includes all possible combinations of the clusters of lines.

16. The access node of claim 12, wherein the processor is configured to activate lines that are part of both the second set and the modified first set.

17. The access node of claim 16, wherein the transmitter is configured to transmit idle symbols in the lines that are part of both the second set and the modified first set.

18. The access node of claim 12, wherein the processor is configured to deactivate lines that are part of the first set and not the modified first set.

19. The access node of claim 12, wherein the processor is configured to obtain at least one quad pair and generate the plurality of groups of lines based on the at least one quad pair.

20. The access node of claim 12, wherein the processor is configured to estimate a precoding matrix based on the modified first set.

21. The access node of claim 20, wherein the processor is configured to estimate a portion of the precoding matrix as:

$$(P_{DD})^{-1} \approx M_{DD} = (B_{DD})^{-1}(2I - P_{DD}(B_{DD})^{-1})$$

where D is a set of inactive lines, $M_{DD}$ is a precoder component matrix and $B_{DD}$ is a sparse matrix associated with interactions of one of the plurality of groups.

22. The access node of claim 12, wherein the plurality of groups of lines includes all possible combinations of a plurality of clusters of the lines, and the access node further comprises:

a memory configured to store block inverse matrices for the clusters, respectively, a number of the plurality of groups of lines being greater than a number of the stored block inverse matrices, and the processor is configured to determine precoder coefficients for the modified first set of lines based on the stored block inverse matrices.

* * * * *